Figure 1:
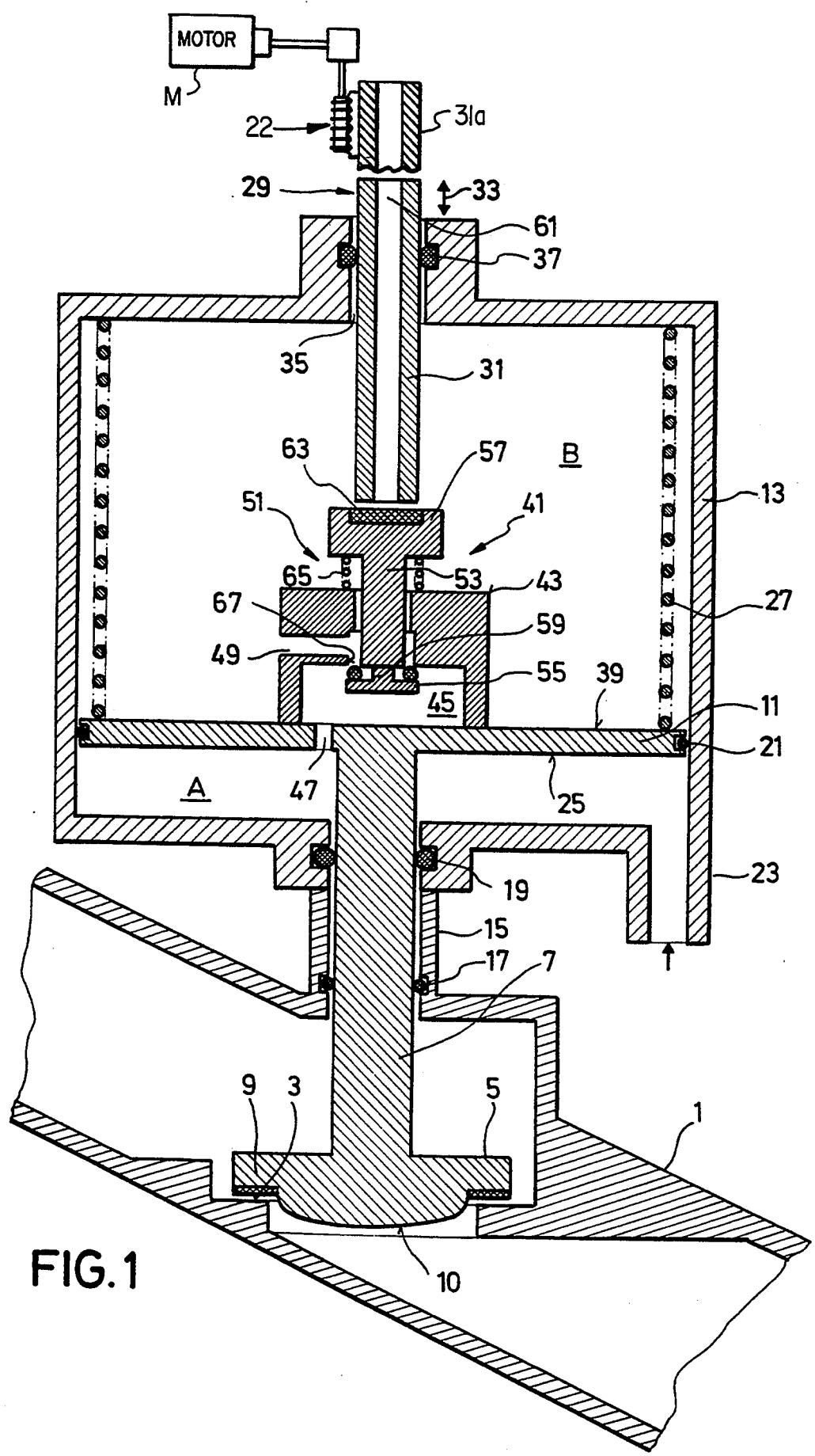

United States Patent [19]
Hofmann

[11] Patent Number: 5,385,328
[45] Date of Patent: Jan. 31, 1995

[54] CONTROL VALVE

[75] Inventor: Ludwig Hofmann, Munich, Germany

[73] Assignee: MMM Munchener Medizin Mechanik GmbH, Munich, Germany

[21] Appl. No.: 74,997

[22] Filed: Jun. 11, 1993

Related U.S. Application Data

[63] Continuation of Ser. No. 818,109, Jan. 8, 1992, abandoned.

[30] Foreign Application Priority Data

Jul. 12, 1991 [DE] Germany .................. 9108617[U]

[51] Int. Cl.⁶ .......................................... F16K 31/124
[52] U.S. Cl. ........................... 251/30.04; 91/376 R; 251/31; 251/38
[58] Field of Search ............ 91/376; 251/30.04, 31, 251/38, 39

[56] References Cited

U.S. PATENT DOCUMENTS

| 2,615,466 | 10/1952 | Garde | 251/31 X |
| 2,758,811 | 8/1956 | Peterson | 251/38 X |
| 3,410,518 | 11/1968 | Carsten | 251/31 |
| 3,584,652 | 6/1971 | Huntington | 137/627.5 |
| 4,793,589 | 12/1988 | Eldredge | 251/38 X |
| 4,875,502 | 10/1989 | Romano | 137/627.5 |
| 5,000,220 | 3/1991 | Elck | 251/38 X |

FOREIGN PATENT DOCUMENTS

| 287299 | 10/1988 | European Pat. Off. |
| 1115041 | 10/1961 | Germany | 251/31 |
| 2358969 | 11/1973 | Germany . |
| 1274883 | 5/1972 | United Kingdom . |
| 847608 | 10/1992 | United Kingdom . |

OTHER PUBLICATIONS

Regelungstechnische Informationen, Herausgeber Samson Apparatebauag, Frankfurt am Main, Weismullerstrasse 3, Nr. 8 (undated).

Primary Examiner—Robert G. Nilson
Attorney, Agent, or Firm—Harris, Tucker & Hardin

[57] ABSTRACT

The present invention refers to a control valve provided with a valve closure member (5) for closing and opening a valve opening. The valve closure member (5) has attached thereto a piston (11), which is arranged such that it is movable within a housing (13), said piston (11) being adapted to be acted upon by the force of a spring (spring 27) in one direction and by a fluid pressure in the opposite direction. A property characterizing the present invention is that the length of the path of movement of the piston (11) can be adjusted with the aid of a positioning means (29, 73). In accordance with a preferred embodiment, the positioning means (29) consists of a rod (31), which is adapted to be axially moved in the direction of movement of the piston (11).

25 Claims, 2 Drawing Sheets

CONTROL VALVE

CROSS REFERENCE TO PREVIOUS APPLICATION

This is a continuation of my prior pending U.S. application Ser. No. 07/818,109 filed Jan. 8, 1992, now abandoned, which in turn claims priority from my prior foreign patent applications serial number G91 08 617.5 filed Jul. 12, 1991, in Germany and European patent application serial number 91 117 762.4 filed Oct. 17, 1991, for which benefit is claimed under 35 U.S.C. §§120 and 119.

DESCRIPTION

Fluidic control valves, and in particular piston-controlled slanted seat valves are known, said valves including a vlave closure member for closing and/or opening a valve opening. The valve closure member comprises a valve head, e.g. in the form of a disk or a cone, and a rod. The valve closure member is adapted to be moved with the aid of a drive means.

Such valves have the disadvantage that the open position is not proportional to the drive acting on the valve e.g. by means of fluid pressure, and that the open position is influenced by the pressure of the medium flowing through the valve, since depending on the pressure of the fluid flowing through the valve, the valve closure member is acted upon more or less strongly and will, consequently, compress to a greater or lesser extent a spring counteracting the pressure applied by said valve closure member.

Position control means for such valves have already been provided more than once; however, the position to be reached is predetermined indirectly, e.g. by pneumatic pressure, with the aid of such position control means.

In the case of the control means which are normally used today, the desired opening value is given in the form of an electric signal. It follows that, for operating the valve described hereinbefore, it will first of all be necessary to carry out a signal conversion by means of which the electric signal will be converted into a proportional pressure signal. This, in turn, entails a very high technical expenditure, the delays occurring being disadvantageous with respect to the time required for the conversion process.

Hence, the present invention is based on the task of improving a control valve of the type mentioned at the beginning in such a way that an adjustment possibility requiring little force is provided in a structurally simple manner which permits rapid adjustment.

In accordance with the present invention, the open position of the valve closure member is predetermined directly with the aid of a positioning means. This serves to achieve the advantage that, when a sufficiently high fluid pressure is applied for moving the piston, the defined open position will be reached in a very short period of time. In this case, the defined open position is essentially no longer dependent on the pressure in the fluid to be controlled, nor on the driving force, nor on any other force influences occurring.

Furthermore, direct opening is achieved without any conversion of signals of different physical categories for directly controlling the control valve.

The subclaims contain advantageous further developments of the present invention.

A particularly simple structural design of the positioning means is obtained on the basis of the feature that said positioning means consists of a rod, which is adapted to be axially moved in the direction of movement of the valve closure member, so that a displacement of the rod will cause a corresponding change in the distance travelled by the valve closure member. In this connection, a ratio of movements of 1:1 can, for example, be chosen so that a given distance travelled by the positioning means will correspond to a given distance travelled by the valve closure member.

In accordance with an alternative embodiment, the positioning means can consist of a rotatably supported spindle, which engages a complementary internal thread of a guide sleeve and which moves said guide sleeve in the axial direction, whereby a particularly precise adjustment possibility will be obtained.

The positioning means can be moved in a simple manner by means of a motor, in particular a stepping motor, said stepping motor carrying out a linear movement or a rotary movement depending on the respective embodiment of said positioning means.

For effecting simple control of the control valve, said control valve includes a control element, which is provided between the positioning means and the valve drive means, said control element stopping the drive, when the valve has reached its predetermined position. An elimination or reduction of the force produced by the drive means is thus achieved, whereby, on the one hand, unnecessary wear of the control valve can be avoided and whereby, on the other hand, a rapid change of position can be carried out in both directions, since there is no unilaterally acting force.

In the case of a first preferred embodiment, the valve drive means is a fluid pressure and the control element is a valve or a closure member.

For effectively applying the fluid pressure, the valve closure member is provided with a piston, which is arranged such that it is movable within a housing, said piston being acted upon by the force of a spring in one direction and by said fluid pressure in the opposite direction, the fluid pressure being constant in the case preferred.

The valve constructed as a control element can be constructed simply and reliably by making use of a rod provided with a first end flange, which is arranged at one of the ends of said rod and which cooperates with a passage opening for opening or closing said valve.

Said rod is provided with a second end flange, which is located at the rod end opposite said first end flange and which is adapted to be brought into contact with a positioning means.

In order to guarantee reliable functioning of the valve means in an advantageous manner, said valve means is provided with a spring, which acts on the first flange in the direction of the closed position of said valve means. It is thus guaranteed that, when a fluid pressure is applied for opening the control valve, adequate rapid opening will reliably take place, since the connection line between the two chambers is closed.

In order to further promote rapid opening of the control valve, the positioning means is also provided with a passage for the fluid introduced in, or contained in the piston housing. This has the effect that, due to the opening movement of the piston and the resultant reduction of the volume of the chamber into which the piston moves, the medium contained in said chamber will be discharged rapidly through the opening in said positioning means so that an essential uncontrolled counterpressure will not occur. The counter-pressure is essentially produced by the oppositely directed force of the spring.

In order to prevent, in the end position of the open control valve, the pressure-generating medium, which is adapted to be transferred through the valve means from one chamber into the next, from continuing to escape from the chamber into which the pressure fluid is transferred, the second end flange has, at its end facing the positioning means, an insert of elastic material. Alternatively, it is also possible to omit the insert, whereby a precisely defined position of contact will be provided due to the cooperation of hard, non-elastic materials.

In accordance with an alternative embodiment of the control valve, the piston has, at its side facing away from the valve closure member, a control rod, which is connected thereto and which is slidably supported in a guide sleeve arranged in the tubular extension of the respective chamber.

In order to realize a simple valve means for the pressure medium, the closable passage extends from the piston side associated with the valve closure member through the piston and the control rod and ends at the circumferential edge of the control rod and is thus open towards the guide sleeve, said passage cooperating with said guide sleeve. In order to avoid a complicated structural design, and in particular in order to achieve a reliable guiding effect for the control rod while simultaneously guaranteeing an adequate valve function, the sleeve is provided with a recess, which extends radially from the inner wall of said sleeve, and with a notch, which extends longitudinally from the outer circumference of said sleeve inwards and which interconnects said recess and the associated chamber of the housing.

For venting the upper piston space, the control rod has, on the other hand, a longitudinal notch formed in its circumference, said longitudinal notch being located below the upper side of the control rod, which comes into contact with the positioning means, and connecting via a passage, which is formed in the sleeve and in the sidewall of the tubular extension, the respective associated chamber in the housing to the surrounding area or separating said chamber from the surrounding area, depending on the axial position of the control rod.

In order to guarantee a mode of operation of the control valve which does not cause damage to the environment, the fluid pressure is generated by pressurized air. This pressurized air can be supplied to the housing at constant pressure so that, depending on the position of the positioning means, defined conditions will always exist within the control valve.

Instead of using a stepping motor, the positioning means can also be moved by hand.

Other suitable drive means for the positioning means can be used as well.

In the hitherto preferred embodiment, the valve driving force is generated by fluid pressure. Alternatively, the valve can be driven electrically in accordance with an additional embodiment; in this case, the control element can consist of a switch.

As a safety measure in the case of failure of the driving power, the control valve according to the present invention is constructed in such a way that, or rather is provided with elements which are well-known to the person skilled in the art and with the aid of which the valve closure member moves to a predetermined position, if the driving power fails.

Figure 2:
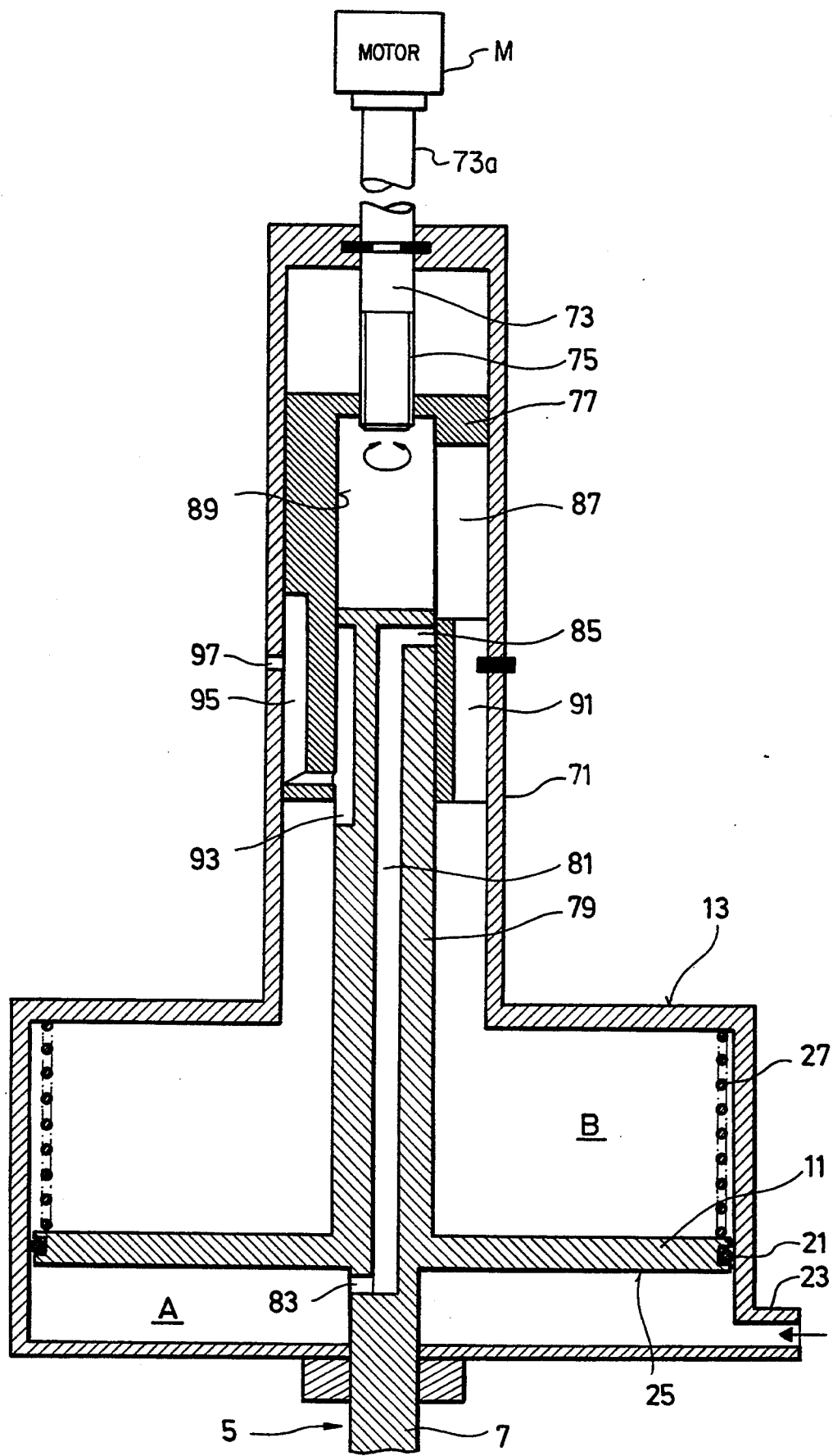

Further details, features and advantages of the present invention will be evident from the description, which follows hereinbelow and which refers to the drawing, in which:

FIG. 1 shows a first embodiment of the control valve according to the present invention in the form of a pressureless closed valve, FIG. 2 shows a second preferred embodiment of the control valve according to the present invention, which is also pressureless closed.

In the following, the embodiment according to FIG. 1 will first be described. A fluid-carrying duct 1 has formed therein a valve seat 3, which is adapted to be brought into contact with a valve closure member 5 for closing the flow cross-section in the fluid-carrying duct 1. The valve head 9 of the valve closure member is provided with a convex structural design 10 in the case of the present example.

The valve closure member is provided with a piston rod 7 connecting the valve head 9 to a piston 11. The piston 11 is arranged in a housing 13 of the control valve according to the present invention. Said piston 11 is arranged such that it is adapted to be moved in said housing in the axial direction of the piston rod 7, the piston rod 7 extending into the housing 13 through an adequate connection tube 15. For sealing the space between the piston rod 7 and the connection tube 15, sealing means 17 and 19 are provided in a manner known per se. Furthermore, a sealing means 21 is provided at the outer circumference of the piston between the outer circumferential wall of said piston and the inner lateral wall of the housing 13.

The piston 11 subdivides the housing 13 into a chamber A and and a chamber B. A pressure medium can be introduced into chamber A through an inlet passage 23, said pressure medium acting on the side 25 of the piston 11 associated with the valve closure member 5.

In the case of the embodiment shown in FIG. 1, the valve closure member 5 is pressed by means of a spring 27 into its closing position, i.e. into a position where it is in contact with the valve seat 3, when there is no pressure at all, or when only little pressure acts on the lateral wall 25. This embodiment is also referred to as "pressureless closed".

The housing 13 has inserted therein a positioning means 29 from the side of said housing 13 which is located opposite the valve closure member 5. The positioning means 29 is defined by a rod 31, which is supported such that it is slidably movable in an inlet opening 35 of the housing 13 in the axial direction in accordance with arrow 33. Suitable sealing means 37 are again provided in a manner known per se positioning means 29 is preferably provided with a motor M coupled with conventional gear drive 22 which engages an extended end portion 31a of rod 31 having gear engaging teeth for gear drive 22 so that rod 31 is moved axially in response to operation of motor M.

A valve means 41 is provided between the positioning means 29 and the side 39 of the piston 11 facing said positioning means.

Said valve means has the following structural design: a shoulder 43 is provided on the side 39 of the piston 11 associated with the positioning means 29, said shoulder including an inlet space 45 for the pressure fluid, which is contained in chamber A and which can flow into said inlet space 45 through a passage opening 47 formed in the piston 11. The shoulder 43 is additionally provided with a passage 49, which extends from the inlet space 45 into chamber B and which is adapted to be closed by a valve.

For this purpose, a rod 53 provided with two end flanges 55 and 57 is provided in the shoulder 43, said rod 53 being slidably arranged in said shoulder 43.

The rod 53 is provided with a first end flange 55, which is located at the rod end facing the inlet space 45 and which is connected to said rod 53 by a neck portion whose diameter is smaller than that of said rod 53.

The other end of the rod 53 is provided with a second end flange 57, which is adapted to be brought into contact with the positioning means 29.

For achieving a soft and sealing engagement with the positioning means 29, which includes a discharge passage 61, an elastic insert 63 is provided in the side of the end flange 57 of the rod 53 associated with said positioning means 29.

In the following, the mode of operation of the control valve according to the first embodiment shown in FIG. 1 will be described. When pressure is applied, i.e. when pressure fluid is introduced through the inlet passage 23, this pressure will propagate within chamber A and act on the lateral wall 25 of the piston 11. In this position, the valve 51 will be closed so that the pressure fluid, which has already entered the inlet space 45 through the passage opening 47, is prevented from passing the valve means 41 and penetrating into chamber B. For this purpose, a helical spring 65 is provided between the shoulder 43 and the end flange 57, said helical spring pressing the opposite end flange 55 against a passage opening 67.

When the piston 11 moves towards the positioning means 29, the volume displaced due to the change in volume within chamber B will be discharged through discharge passage 61, since said discharge passage 61 of said positioning means 29 is open.

When the end flange 57 of the valve means 41 comes into contact with the positioning means 29, it will close the discharge passage 61. At the same time, the piston 11 will, however, still move towards the positioning means 29 so that a relative movement between the rod 53 and the flanges 55 and 57 with respect to the shoulder 43 will take place. This will have the effect that the valve 51 will be opened, and the pressure medium will flow through passage 49 from chamber A into chamber B.

This will cause comparatively rapidly, depending on the velocity of flow of the pressure fluid through passage 49, a reduction of the pressure difference between the two chambers. After the resultant partial equalization and due to the force still acting on the wall 25 of the piston 11 as well as due to the additional force created by spring 27, the piston will be decelerated so that said piston, after having come to a standstill, will move in the opposite direction towards the valve seat 3, when the forces consisting essentially of the force created by spring 27 and of the fluid pressure force in chamber B outweigh the force created by the fluid pressure in chamber A. This movement will continue until the end flange 57 will come out of engagement with the positioning means 29, whereby the passage opening 67 will be closed by the end flange 55. Afterwards, the excess pressure in chamber B can escape into the atmosphere.

Reference must be made to the fact that, during operation, a constant fluid pressure will normally act on the piston. This will, in turn, have the effect that, when the positioning means 29 is moved out of the housing 13, the piston and, consequently, the whole valve closure member 5 will be caused to follow immediately, almost without any delay, whereby a rapidly reacting control valve will be created.

The embodiment according to FIG. 2 will now be described in the text following hereinbelow.

In said description, the elements comparable with those of the embodiment according to FIG. 1 will be provided with the same reference numerals. The valve head 9, which is located below the piston rod 7 and arranged in the fluid-carrying duct 1, was omitted in this figure.

The housing 13 has a tubular extension 71, which is provided at the housing end located opposite the valve closure member 5 and into which a positioning element 73 extends again from the side located opposite the valve closure member 5; contrary to the sole positioning means 29 of FIG. 1, said positioning element 73 is rotatably supported. Said positioning element 73 itself is supported such that it cannot move in the axial direction. At its end projecting into the extension 71, said positioning element 73 is provided with an external thread 75, which is in engagement with a positioning or guide sleeve 77 adapted to be longitudinally moved in the axial direction. A control rod 79 is slidably arranged in said guide sleeve 77, said control rod 79 being, in turn, connected to the piston 11. It follows that the positioning means of the second embodiment comprises the positioning element 73 and the guide sleeve 77. Positioning element 73 is rotated by means of a motor M rotably connected to an extension 73a of the positioning element extending from tubular extension 71.

The control rod 79 has provided therein a passage 81 through which the pressure fluid can flow. Said passage 81 begins with an inlet opening 83, which opens into chamber A, and ends with an outlet opening 85, which ends at the outer circumference of the control rod 79. For creating the pressure compensation between chamber A and chamber B, the guide sleeve 77 has provided therein a radial recess 87 extending from the inner wall of the guide sleeve 77 outwards—in the case of the present example up to the inner wall of the extension 71. Between said recess 87 and said chamber B, a notch 91 is additionally provided in said guide sleeve 77, said notch 91 extending longitudinally in the axial direction from said recess 87 up to the axial end of the guide sleeve 77, whereby a passage extending along the sidewall of said extension 71 up to chamber B is formed.

In order to create a connection extending between chamber B and the surrounding area similar to the one provided in the case of the embodiment according to FIG. 1, the control rod 79 has provided therein a longitudinal notch 93, which, depending on the position of said control rod 79, provides a connection between the space of chamber B and a discharge passage 95 formed in said guide sleeve 77 and communicating with an outlet opening 97 provided in the extension 71 of the housing 13.

In the following, the mode of operation of the embodiment according to FIG. 2 is described. In the case of the example shown, chamber B communicates via the longitudinal notch 93 with the discharge passage 95 and the outlet opening 97. The outlet opening 85 ends at the inner wall 89 of the guide sleeve 77 so that the passage 81 will be closed.

When the piston 11 now moves in the direction of chamber B, this will have the effect that, on the one hand, the outlet opening 85 towards the recess 87 will be opened and that, on the other hand, the longitudinal notch 93 will be closed with respect to chamber B so that the pressure fluid will now flow through the passage 81 into chamber B and produce a counterpressure comparatively rapidly. Subsequently, conditions comparable with those existing in the case of the embodiment according to FIG. 1 will occur again.

Adjustment of the positioning means is effected by rotating the positioning element 73, which will have the effect that the guide sleeve 77 is axially moved in the longitudinal direction within the extension 71, whereby the recess 87 as well as the discharge passage 95 will be displaced with respect to the respective openings in the control rod 79 so that this will, in turn, entail a correspondingly changed piston stroke of the piston 11.

In order to sum up, it can therefore be stated that with the aid of the present invention a control valve is created, which has a simple structural design, is reliable in operation and resistant to wear and which will also resist high operational loads. Furthermore, a precisely preadjustable movement of the piston and, consequently, movement of the valve are achieved by the adjustment according to the present invention. In particular, by applying an adequate constant pressure, it will be possible to achieve a defined, predetermined movement of the piston permitting a corresponding adjustment of the control valve. Moreover, by means of the structural design according to the present invention, it will be possible to achieve an adequately fast, almost instantaneous opening and, depending on the structural design of the valve in question, also closing of the flow-through-opening which has to be closed or reduced in size. The actuating force can be kept low and reliable positioning is made possible.

Alternatively to the second embodiment according to FIG. 2, the positioning element 73 can also be constructed as a linearly movable pin, which is connected to the guide sleeve 77 in an adequate manner such that it is secured against rotation relative thereto.

In an alternative embodiment it is, furthermore, also possible to bring the piston 11 directly into contact with the positioning means 29. For displacing the positioning means 29 against the pressure acting on the piston 11, said piston 11 is withdrawn at least partly and reapplied when the positioning means has reached its end position.

I claim:

1. A control valve for rapidly opening and/or closing a valve opening to control flow of a controlled fluid in response to pressure of an operating fluid separate from the controlled fluid, comprising a valve closure member (5) for closing and/or opening a valve opening in a controlled fluid duct, said valve closure member (5) being provided with a valve head (9) and a rod (7) and being adapted to be moved between an open and a closed position by a drive means provided with an adjustable positioning means which predetermines the open position in the valve closure member, a control element provided between the positioning means and the valve drive means, said control element stopping the valve drive means, when the predetermined position has been reached, said drive means being connected to a separate operating fluid which receives pressurized operating fluid which is isolated from the fluid in the controlled fluid duct, to operate the drive means and move the valve closure member independently of the pressure in the controlled fluid duct.

2. A control valve according to claim 1, wherein the positioning means comprises a rod, which is adapted to be axially moved in the direction of movement of the valve closure member.

3. A control valve according to claim 1, wherein the positioning means comprises a rotatably supported spindle and a guide sleeve.

4. A control valve according to claim 1 wherein the positioning means is movable to the respective desired position by means of a motor.

5. A control valve according to claim 4, wherein said motor is a stepping motor.

6. A control valve according to claim 1, wherein the control element has a valve.

7. A control valve according to claim 6, wherein the valve closure member is provided with a piston, which is arranged such that it is movable within a housing, said piston being adapted to be acted upon by the force of a spring in one direction and by said fluid pressure in the opposite direction.

8. A control valve according to claim 7, arranged to have two chambers (A, B) which are formed within the housing by the piston of the valve closure member, the chambers being adapted to be interconnected by a closable passage.

9. A control valve according to claim 8, wherein said closable passage is provided with a valve means defining said control element.

10. A control valve according to claim 9, wherein the valve means is composed of a rod provided with a first end flange, which is arranged at one of the ends of said rod and which cooperates with a passage opening for opening or closing said valve.

11. A control valve according to claim 10, wherein the rod is provided with a second end flange, which is located at the rod end opposite said first end flange and which is adapted to be brought into contact with the positioning means.

12. A control valve according to claim 9 wherein the valve means is provided with a spring, which acts on said first end flange in the direction of the closed position of said valve.

13. A control valve according to claim 1 wherein the positioning means includes a passage for operating fluid introduced in the piston housing.

14. A control valve according to claim 11 wherein at its end facing the positioning means, the second end flange is provided with an insert of elastic material.

15. A control valve according to claim 3 wherein at its side facing away from the valve closure member, the piston is provided with a control rod, which is connected thereto and which is slidably supported in the guide sleeve arranged in a tubular extension of the housing.

16. A control valve according to claim 15 wherein the closable passage extends from the piston side facing the valve closure member through the piston and the control rod and is open at the circumferential edge of the control rod towards the guide sleeve and cooperates therewith.

17. A control valve according to claim 16, wherein the guide sleeve is provided with a recess, which extends radially from the inner wall of said guide sleeve, and with a notch, which extends longitudinally from the outer circumference of the guide sleeve inwards and which interconnects said recess and the associated chamber of the housing.

18. A control valve according to claim 15 wherein in the end portion of the control rod facing the positioning element, a longitudinal notch is formed below the end side of said control rod at the outer circumference thereof, said longitudinal notch communicating with the surrounding area via a discharge passage, which is formed in said guide sleeve, and via an outlet opening provided in the extension, and that the associated chamber can be connected to the surrounding area and separated therefrom depending on the axial position of the control rod.

19. A control valve according to claim 15 wherein the adjustment of the control valve is carried out by axially moving the guide sleeve.

20. A control valve according to claim 1 wherein the operating fluid pressure is generated by pressurized air.

21. A control valve according to claim 1 wherein the positioning means is adapted to be moved by hand.

22. A control valve according to claim 1, wherein the valve positioning means is driven electrically.

23. A control valve according to claim 1 wherein if the drive means fails, the valve closure member moves to a predetermined position under the influence of a biasing member.

24. A control valve according to claim 1 wherein said drive means is responsive to controlled fluid pressure provided through a control element.

25. A control valve according to claim 24 wherein said control element provides said controlled fluid pressure to operate the drive means depending upon the location of the positioning means relative to the position of the drive means.

* * * * *